United States Patent
Sakuma et al.

(10) Patent No.: US 10,029,443 B2
(45) Date of Patent: Jul. 24, 2018

(54) GLASS FIBER FABRIC-RESIN COMPOSITION LAMINATE

(71) Applicant: NITTO BOSEKI CO., LTD., Fukushima (JP)

(72) Inventors: Dai Sakuma, Fukushima (JP); Noriyoshi Sato, Fukushima (JP); Toshihiro Tashiro, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 112 days.

(21) Appl. No.: 14/916,362

(22) PCT Filed: Oct. 16, 2014

(86) PCT No.: PCT/JP2014/077529
§ 371 (c)(1),
(2) Date: Mar. 3, 2016

(87) PCT Pub. No.: WO2015/079820
PCT Pub. Date: Jun. 4, 2015

(65) Prior Publication Data
US 2016/0193807 A1    Jul. 7, 2016

(30) Foreign Application Priority Data

Nov. 29, 2013    (JP) .................................. 2013-248747

(51) Int. Cl.
*B32B 5/26*    (2006.01)
*B32B 7/12*    (2006.01)
(Continued)

(52) U.S. Cl.
CPC .................. *B32B 5/26* (2013.01); *B32B 7/12* (2013.01); *B32B 27/12* (2013.01); *B32B 27/34* (2013.01);
(Continued)

(58) Field of Classification Search
None
See application file for complete search history.

(56) References Cited

U.S. PATENT DOCUMENTS 3,408,239 A    10/1968    Wedin
4,787,125 A    11/1988    Pinsky et al.
(Continued)

FOREIGN PATENT DOCUMENTS

CN    202563995 U    11/2012
JP    H04-250033 A    9/1992
(Continued)

OTHER PUBLICATIONS

Machine English_Translation_JP_08207200_A; Watanabe, S.; Fiber REinforced Thermoplastic Resin Composite Material; Aug. 13, 1996; JPO; whole document.*
(Continued)

*Primary Examiner* — Tahseen N Khan
(74) *Attorney, Agent, or Firm* — Carrier Blackman & Associates, P.C.; Joseph P. Carrier; Anne G. Sabourin (57) ABSTRACT

Provided is a glass fiber fabric-resin composition laminate which is thinner than the conventional glass fiber fabric-resin composition laminates and has a strength equal to or higher than that of the conventional laminates. In the glass fiber fabric-resin composition laminate 1, one or more layers of first glass fiber fabrics 2 to 5 have a total thickness of 50 to 100% with respect to the overall thickness. The glass composition of the first glass fiber fabrics 2 to 5 is 57 to 70 mass % of $SiO_2$, 18 to 30 mass % of $Al_2O_3$, 5 to 15 mass % of MgO, 0 to 12 mass % of CaO, 0 to 1 mass % of at least one of $Li_2O$, $Na_2O$, and $K_2O$, 0 to 1 mass % of $TiO_2$, and 0 to 1 mass % of $B_2O_3$.

9 Claims, 3 Drawing Sheets (51) Int. Cl.
*B32B 27/12* (2006.01)
*B32B 27/34* (2006.01)

(52) U.S. Cl.
CPC ....... *B32B 2250/20* (2013.01); *B32B 2250/42* (2013.01); *B32B 2255/02* (2013.01); *B32B 2255/26* (2013.01); *B32B 2260/046* (2013.01); *B32B 2262/101* (2013.01); *B32B 2307/51* (2013.01); *B32B 2307/54* (2013.01); *B32B 2457/00* (2013.01)

(56) References Cited

U.S. PATENT DOCUMENTS

| | | |
|---|---|---|
| 5,098,778 A | 3/1992 | Minnick |
| 5,851,932 A | 12/1998 | Dickson et al. |
| 2003/0054936 A1* | 3/2003 | Tamura .................. C03C 3/091 501/35 |
| 2011/0281484 A1 | 11/2011 | Yoshida et al. |
| 2012/0060678 A1* | 3/2012 | Peters .................... B29C 70/06 89/36.02 |
| 2012/0060679 A1* | 3/2012 | Peters .................... B29C 70/22 89/36.02 |
| 2012/0163987 A1* | 6/2012 | Hausrath ................ C03C 3/087 416/241 R |

FOREIGN PATENT DOCUMENTS

| | | |
|---|---|---|
| JP | H06-224525 A | 8/1994 |
| JP | H06-262733 A | 9/1994 |
| JP | H07-266435 A | 10/1995 |
| JP | 08207200 A * | 8/1996 |
| JP | H08-207200 A | 8/1996 |
| JP | 2009-067852 A | 4/2009 |
| JP | 2009070921 a * | 4/2009 |
| JP | 2012-076410 A | 4/2012 |
| JP | 2012-116872 A | 6/2012 |
| TW | 1228520 B | 3/2005 |
| TW | 201217295 A | 5/2012 |
| WO | 03/022565 A1 | 3/2003 |
| WO | 2008/153515 A4 | 12/2008 |
| WO | 2009/063809 A1 | 5/2009 |
| WO | 2012/140908 A1 | 10/2012 |

OTHER PUBLICATIONS

Machine English_Translation_JP_2009070921_A; Endo, T.; Insulative Resin Sheet Containing Glass Woven Fabric; Apr. 2, 2009; JPO; whole document.*
European Search Report dated Aug. 7, 2017 issued in the counterpart EP patent application 14866036.8.
Office Action dated Mar. 26, 2018 issued in the counterpart Taiwanese patent application 103137431.

* cited by examiner

GLASS FIBER FABRIC-RESIN COMPOSITION LAMINATE

TECHNICAL FIELD

The present invention relates to a glass fiber fabric-resin composition laminate in which a plurality of glass fiber fabrics are laminated via a resin composition.

BACKGROUND ART

Portable electronic devices such as mobile phones, smartphones, and tablet terminals are convenient to carry around and consequently demanded for the entire device to be thinner and for the battery capacity to be larger for ensuring a longer battery life. Large-capacity batteries are thick and hence thinning down a housing of the above device is conceived for achieving a thinner device in its entirety.

Conventionally, glass fiber fabric-resin composition laminates obtained by laminating a plurality of glass fiber fabrics through a resin composition are known as materials to be used for housings of the portable electronic devices (see, e.g., Patent Literature 1).

The glass fiber fabric-resin composition laminate described in Patent Literature 1 is a laminate of one or two glass fiber fabrics selected from the group consisting of IPC Specification 2116, IPC Specification 7628, and IPC Specification 1080, tradename WEA22F (Nitto Boseki Co., Ltd.) in three to five layers through a polyphenylene sulfide resin. All the glasses constituting the above glass fiber fabrics are E-glass and the glass composition thereof, based on the total mass, has an $SiO_2$ content of 52 to 56 mass %, an $Al_2O_3$ content of 12 to 16 mass %, a total content of CaO and MgO of 20 to 25 mass %, and a $B_2O_3$ content of 5 to 10 mass %.

The conventional glass fiber fabric-resin composition laminate has a thickness in a range from 510 to 650 μm.

CITATION LIST

Patent Literature

Patent Literature 1: Japanese Patent Laid-Open No. H8-207200

SUMMARY OF INVENTION

Technical Problem

It is desired, however, for the thickness to be smaller than that of the conventional glass fiber fabric-resin composition laminates and further for the strength to be equal to or higher than that of the conventional glass fiber fabric-resin composition laminates.

The present invention has an object to provide a glass fiber fabric-resin composition laminate thinner than the conventional glass fiber fabric-resin composition laminates and capable of having a strength equal to or higher than that of the conventional glass fiber fabric-resin composition laminates.

Solution to Problem

For accomplishing the above object, the present invention provides a glass fiber fabric-resin composition laminate comprising a plurality of glass fiber fabrics laminated via a resin composition, wherein the plurality of glass fiber fabrics comprising one or more layers of a first glass fiber fabric, the one or more layers of the first glass fiber fabric has a total thickness in a range from 50 to 100% with respect to a total thickness of the plurality of glass fiber fabrics, and a glass composition of the first glass fiber fabric, based on the total mass, has an $SiO_2$ content of 57 to 70 mass %, an $Al_2O_3$ content of 18 to 30 mass %, an MgO content of 5 to 15 mass %, a CaO content of 0 to 12 mass %, a content of at least one of $Li_2O$, $Na_2O$, and $K_2O$ of 0 to 1 mass %, a $TiO_2$ content of 0 to 1 mass %, and a $B_2O_3$ content of 0 to 1 mass %.

The glass fiber fabric-resin composition laminate of the present invention has the one or more layers of the first glass fiber fabric with a total thickness in a range from 50 to 100% with respect to the total thickness of the plurality of glass fiber fabrics, and the strength thereof largely depends on the strength of the first glass fiber fabric.

The glass composition of the first glass fiber fabric has larger contents of $SiO_2$ and $Al_2O_3$ than those of E-glass, which constitutes the glass fiber fabric used for the above conventional glass fiber fabric-resin composition laminate. The first glass fiber fabric consequently has higher strength than that of the glass fiber fabric used for the above conventional glass fiber fabric-resin composition laminates.

The glass fiber fabric-resin composition laminate of the present invention, even with the overall thickness thinner than the conventional glass fiber fabric-resin composition laminates, can have a strength equal to or higher than that of the conventional glass fiber fabric-resin composition laminates.

If a total thickness of the first glass fiber fabric is below 50% with respect to the total thickness of the plurality of glass fiber fabrics, the glass fiber fabric-resin composition laminate fails to have a strength equal to or higher than that of the conventional glass fiber fabric-resin composition laminates when the overall thickness is made thinner than that of the conventional glass fiber fabric-resin composition laminates. Alternatively, for ensuring a strength equal to or higher than that of the conventional glass fiber fabric-resin composition laminates, the overall thickness is compromised to be thicker than that of the conventional glass fiber fabric-resin composition laminates.

Thinness and strength cannot be compatibly achieved by the glass fiber fabric-resin composition laminate comprising the first glass fiber fabric having a glass composition outside the above range.

In the glass fiber fabric-resin composition laminate of the present invention, all layers may be constituted by the first glass fiber fabric, but one or more layers of a second glass fiber fabric may be used in addition to the first glass fiber fabric. As the second glass fiber fabric, E-glass with a glass composition having, for example, an $SiO_2$ content of 52 to 56 mass %, an $Al_2O_3$ content of 12 to 16 mass %, a total content of CaO and MgO of 20 to 25 mass %, and a $B_2O_3$ content of 5 to 10 mass %, based on the total mass, may be used.

In the glass fiber fabric-resin composition laminate of the present invention, the glass fiber fabric of each layer preferably has a thickness in a range from 30 to 150 μm. With such a thickness range, the glass fiber fabric-resin composition laminate can compatibly achieve the thinness and strength.

The glass fiber fabric with a thickness below 30 μm is difficult to produce or the glass fiber fabric-resin composition laminate may fail to achieve the strength. The use of the glass fiber fabric having a thickness exceeding 150 μm may cause difficulty in obtaining a thin glass fiber fabric-resin composition laminate.

In the glass fiber fabric-resin composition laminate of the present invention, the outermost layer glass fiber fabric preferably has a thickness in a range from 30 to 100 μm. With such a thickness range, the glass fiber fabric-resin composition laminate is assured to obtain a smooth surface.

When the outermost layer glass fiber fabric has a thickness below 30 μm, the production thereof is difficult as described earlier or the glass fiber fabric-resin composition laminate may fail to achieve the strength. The surface roughness of the glass fiber fabric-resin composition laminate depends on the thickness of the outermost layer glass fiber fabric. The outermost layer glass fiber fabric with a thickness exceeding 100 μm may fail to obtain a smooth surface.

The glass fiber fabric-resin composition laminate of the present invention preferably comprises other glass fiber fabrics with the same composition and the same thickness respectively provided on both front and back sides of a glass fiber fabric of a center layer so as to be plane-symmetrical with respect to a plane equally dividing the glass fiber fabric of the center in the thickness direction as a symmetric plane. Such a structure can prevent the glass fiber fabric-resin composition laminate from having torsion.

BRIEF DESCRIPTION OF DRAWINGS

FIGS. 2A-2B are sectional views showing the glass fiber fabric-resin composition laminate in accordance with a variant of the embodiment.

DESCRIPTION OF EMBODIMENTS

Hereinafter, embodiments of the glass fiber fabric-resin composition laminate according to the present invention are described with reference to the drawings.
[Structure of Glass Fiber Fabric-Resin Composition Laminate]

Figure 1:
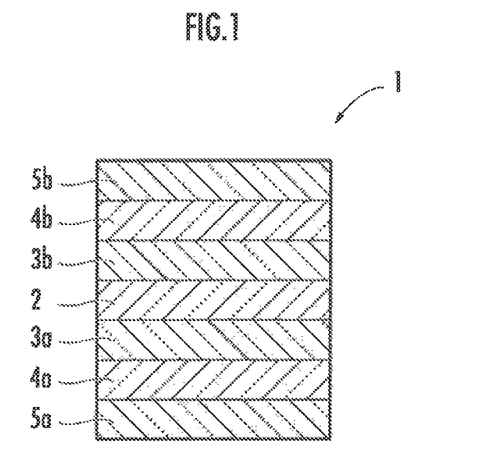
FIG. 1 is a sectional view showing the glass fiber fabric-resin composition laminate in accordance with an embodiment of the present invention.

The glass fiber fabric-resin composition laminate 1 in accordance with the present embodiment shown in FIG. 1 comprises a plurality of glass fiber fabrics with a thickness in a range from 30 to 150 μm laminated via a resin composition.

The glass fiber fabric-resin composition laminate 1 has a seven-layer structure in which glass fiber fabrics 3a and 3b of the second layer, glass fiber fabrics 4a and 4b of the third layer, and glass fiber fabrics 5a and 5b of the fourth layer are sequentially laminated on both front and back sides of glass fiber fabric 2 of the center layer, respectively, through the resin composition. Hereinafter, the glass fiber fabrics 3a, 3b, 4a, 4b, 5a, and 5b are sometimes abbreviated to as glass fiber fabrics 3, 4, and 5, respectively. The glass fiber fabrics 5a and 5b of the fourth layer equivalent to the outermost layer have a thickness in a range from 30 to 100 μm.

The glass fiber fabrics 2 to 5 of each layer have a predetermined composition and thickness respectively so as to be plane-symmetrical with respect to a plane equally dividing the glass fiber fabric 2 of the center layer in the thickness direction as a symmetric plane.

The glass fiber fabrics 2 to 5 of each layer may all be composed of the first glass fiber fabric having the first glass composition or composed of the first glass fiber fabric and the second glass fiber fabric having the second glass composition in combination.

The glass constituting the first glass fiber fabric has the first glass composition, which has, based on the total mass, an $SiO_2$ content of 57 to 70 mass %, an $Al_2O_3$ content of 18 to 30 mass %, an MgO content of 5 to 15 mass %, a CaO content of 0 to 12 mass %, a content of at least one of $Li_2O$, $Na_2O$, and $K_2O$ of 0 to 1 mass %, a $TiO_2$ content of 0 to 1 mass %, and a $B_2O_3$ content of 0 to 1 mass %.

The first glass composition herein preferably has, based on the total mass, an $SiO_2$ content of 57 to 70 mass %, an $Al_2O_3$ content of 20 to 30 mass %, an MgO content of 5 to 15 mass %, a CaO content of 0 to 10 mass %, a content of at least one of $Li_2O$, $Na_2O$, and $K_2O$ of 0 to 1 mass %, a $TiO_2$ content of 0 to 1 mass %, and a $B_2O_3$ content of 0 to 1 mass %. The first glass composition more preferably has, based on the total mass, an $SiO_2$ content of 58 to 68 mass %, an $Al_2O_3$ content of 21 to 27 mass %, an MgO content of 8 to 13 mass %, a CaO content of 0.01 to 9 mass %, a content of at least one of $Li_2O$, $Na_2O$, and $K_2O$ of 0.01 to 1 mass %, a $TiO_2$ content of 0.01 to 1 mass %, and a $B_2O_3$ content of 0 to 1 mass %. The first glass composition further preferably has, based on the total mass, an $SiO_2$ content of 63 to 67 mass %, an $Al_2O_3$ content of 22 to 26 mass %, an MgO content of 9 to 11 mass %, a CaO content of 0.01 to 0.2 mass %, a content of at least one of $Li_2O$, $Na_2O$, and $K_2O$ of 0.01 to 0.5 mass %, a $TiO_2$ content of 0.01 to 0.5 mass %, and a $B_2O_3$ content of 0 to 0.1 mass %.

Hereinafter, the glass having the first glass composition is abbreviated to as "T-glass" and the first glass fiber fabric is abbreviated to as "T-glass fiber fabric."

The glass constituting the second glass fiber fabric has the second glass composition, which has, based on the total mass, an $SiO_2$ content of 52 to 56 mass %, an $Al_2O_3$ content of 12 to 16 mass %, a total content of CaO and MgO of 20 to 25 mass %, and a $B_2O_3$ content of 5 to 10 mass %, which is equivalent to the so-called "E-glass". The second glass fiber fabric is the same as those used for the conventional glass fiber fabric-resin composition laminate. Hereinafter, the glass having the second glass composition is abbreviated to as "E-glass" and the second glass fiber fabric is abbreviated to as "E-glass fiber fabric."

The glass fiber fabrics 2 to 5 of each layer are set to have a predetermined thickness, respectively, in such a way that the total thickness of the glass fiber fabrics 2 to 4 of the first to third layers composed of the T-glass fiber fabric is 50% or more with respect to the total thickness of the glass fiber fabrics 2 to 5 of all layers.

T-glass constituting the T-glass fiber fabric has larger contents of $SiO_2$ and $Al_2O_3$ than those of E-glass, which composes the E-glass fiber fabric. The T-glass fiber fabric consequently has higher strength than that of the E-glass fiber fabric.

As described above, the glass fiber fabric-resin composition laminate 1 according to the present embodiment comprises, with respect to the total thickness of the glass fiber fabrics 2 to 5 of all layers, a 50% or more of the T-glass fiber fabric, which has a higher strength. In the conventional glass fiber fabric-resin composition laminate, all layers comprise the E-glass fiber fabric, which has a lower strength than that of the T-glass fiber fabric.

The glass fiber fabric-resin composition laminate 1 according to the present embodiment consequently has a strength equal to or higher than that of the conventional glass fiber fabric-resin composition laminate even when an overall thickness is thinner than the conventional glass fiber fabric-resin composition laminate. As a result, the glass fiber fabric-resin composition laminate 1 can compatibly achieve the thinness and strength.

Using the glass fiber fabric-resin composition laminate 1 for housings of the portable electronic devices such as mobile phones, smartphones, and tablet terminals enables such a device to mount a thick large-capacity battery while being made thinner in its entirety.

The glass fiber fabric-resin composition laminate 1 comprises the glass fiber fabrics 3a, 3b, 4a, 4b, 5a, and 5b for each layer with, in each layer, the same composition and the same thickness provided so as to be plane-symmetrical with respect to a plane equally dividing the glass fiber fabric 2 of the center layer in the thickness direction as a symmetric plane. In such a structure, the glass fiber fabric-resin composition laminate 1 is prevented from having torsion.

The glass fiber fabric-resin composition laminate 1 comprises the glass fiber fabric 5 of the fourth layer, equivalent to the outermost layer, having a thickness in a range from 30 to 100 μm, thereby assuredly achieving a smooth surface. The smooth surface can be glossy to provide the glass fiber fabric-resin composition laminate 1 with an appealing texture.

The glass fiber fabric-resin composition laminate 1 according to the present embodiment can have a clear surface when the glass fiber fabric 5 of the outermost layer is composed of the E-glass fiber fabric.

The glass fiber fabric-resin composition laminate 1 according to the present embodiment can minimize a warp and consequently achieve the dimensional stability when the glass fiber fabric 5 of the outermost layer is composed of the T-glass fiber fabric.

[Method for Producing the Glass Fiber Fabric-Resin Composition Laminate Using a Resin Film]

A method for producing the glass fiber fabric-resin composition laminate 1 shown in FIG. 1 is then described. The present embodiment to be described hereafter is a case where the glass fiber fabric 2 of the center layer, the glass fiber fabric 3 of the second layer, and the glass fiber fabric 4 of the third layer are composed of the first glass fiber fabric and the glass fiber fabric 5 of the fourth layer is composed of the second glass fiber fabric.

A T-glass fiber fabric having a predetermined thickness and an E-glass fiber fabric having a predetermined thickness are prepared.

As the T-glass fiber fabric, for example, a T-glass fiber fabric with a thickness of 50 μm (manufactured by Nitto Boseki Co., Ltd., IPC Specification 1078) or a T-glass fiber fabric with a thickness of 70 μm (manufactured by Nitto Boseki Co., Ltd., IPC Specification 3313) may be used.

As the E-glass fiber fabric, an E-glass fiber fabric with a thickness of 50 μm (manufactured by Nitto Boseki Co., Ltd., IPC Specification 1078) or an E-glass fiber fabric with a thickness of 70 μm (manufactured by Nitto Boseki Co., Ltd., IPC Specification 3313) may be used.

Both glass fiber fabrics are treated with a silane coupling agent, open-fiber processed using injected water, and cut to a predetermined dimension. The silane coupling agent treatment is carried out using N-(vinylbenzyl)-2-aminoethyl-3-aminopropyltrimethoxysilane as the silane coupling agent, and 0.1 parts by mass of the silane coupling agent is adhered to 100 parts by mass of each glass fiber fabric.

The T-glass fiber fabric, the E-glass fiber fabric, and a resin film composed of a resin composition and having a thickness of 10 to 50 μm are superimposed on a mirror plate to form a laminate composed of the glass fiber fabrics and the resin composition layers (hereinafter referred to as the glass fiber fabric laminate) Examples of the resin composition usable include thermoplastic resins such as polyamide 6 resin, polyphenylene sulfide resin, polycarbonate resin, and polyethylene terephthalate resin, and thermosetting resins such as epoxy resin and polyester resin.

For obtaining the above glass fiber fabric laminate, the resin film is superimposed on the mirror plate and subsequently the E-glass fiber fabric is superimposed thereon to form the glass fiber fabric 5a of the fourth layer with a desired thickness in a range from 30 to 100 μm. The resin film is impregnated into the E-glass fiber fabric at the time of pressing to be described later and the number of the resin films to be used is determined so that a suitable amount of impregnation is achieved.

After superimposing the resin film on the glass fiber fabric 5a of the fourth layer, one or more T-glass fiber fabrics are superimposed thereon to form the glass fiber fabric 4a of the third layer with a desired thickness in a range from 30 to 100 μm.

After superimposing the resin film on the glass fiber fabric 4a of the third layer, one or more T-glass fiber fabrics are superimposed thereon to form the glass fiber fabric 3a of the second layer with a desired thickness in a range from 30 to 100 μm.

After superimposing the resin film on the glass fiber fabric 3 of the second layer, one or more T-glass fiber fabrics are superimposed thereon to form the glass fiber fabric 2 of the center layer with a desired thickness in a range from 30 to 100 μm.

After superimposing the resin film on the glass fiber fabric 2 of the center layer, one or more T-glass fiber fabrics are superimposed thereon to form the glass fiber fabric 3b of the second layer, which has the same thickness as that of the glass fiber fabric 3a of the second layer.

After superimposing the resin film on the glass fiber fabric 3b of the second layer, one or more T-glass fiber fabrics are superimposed thereon to form the glass fiber fabric 4b of the third layer, which has the same thickness as that of the glass fiber fabric 4a of the third layer.

After superimposing the resin film on the glass fiber fabric 4b of the third layer, one or more E-glass fiber fabrics are superimposed thereon to form the glass fiber fabric 5b of the fourth layer, which has the same thickness as that of the glass fiber fabric 5a of the fourth layer.

The resin film is then superimposed on the glass fiber fabric 5b of the fourth layer. The glass fiber fabric laminate is thus formed by the above procedure.

Other mirror plates described above are superimposed on the obtained glass fiber fabric laminate, pressed using a press machine under the conditions of a temperature of 220 to 260° C., a surface pressure of 5 to 20 kg/cm², and a pressure application time of 10 to 120 seconds, and subsequently cooled. When pressed as described above, the resin composition is fused and impregnated into the T-glass fiber fabric or the E-glass fiber fabric and the glass fiber fabric laminate is consequently integrated. The glass fiber fabric-resin composition laminate 1 shown in FIG. 1 can be thus obtained.

The resin composition is impregnated into the T-glass fiber fabric or the E-glass fiber fabric when pressed as described above and the resin film with a substantially negligible thickness is used in the glass fiber fabric-resin composition laminate 1. The final overall thickness of the glass fiber fabric-resin composition laminate 1 is substantially equal with respect to the total thickness of the superimposed T-glass fiber fabric and the E-glass fiber fabric.

[Method for Producing the Glass Fiber Fabric-Resin Composition Laminate Using a Thermosetting Resin]

The glass fiber fabric-resin composition laminate 1 may also be produced, for example, by the following method. A resin composition such as an epoxy resin containing a curing agent is applied to and impregnated into the T-glass fiber fabric or the E-glass fiber fabric using a brush or a roller, and the fabrics are, while being defoamed, superimposed to a desired thickness to produce a laminate composed of the T-glass fiber fabric and the resin composition layers (hereinafter referred to as the T-glass fiber fabric laminate) or a laminate composed of the E-glass fiber fabric and the resin composition layers (hereinafter referred to as the E-glass fiber fabric laminate).

The obtained T-glass fiber fabric laminate or the E-glass fiber fabric laminate is dried using a hot air dryer at 120 to 150° C. for 3 to 8 minutes to prepare a T-glass prepreg or an E-glass prepreg with a desired thickness in a range from 30 to 100 µm.

A plurality of T-glass prepregs or E-glass prepregs are superimposed on a mirror plate as described below to form the glass fiber fabric laminate.

An E-glass prepreg equivalent to the glass fiber fabric 5a of the fourth layer, a T-glass prepreg equivalent to the glass fiber fabric 4a of the third layer, another T-glass prepreg equivalent to the glass fiber fabric 3a of the second layer, and another T-glass prepreg equivalent to the glass fiber fabric 2 of the center layer are sequentially superimposed on the mirror plate.

Another T-glass prepreg equivalent to the glass fiber fabric 3b of the second layer, another T-glass prepreg equivalent to the glass fiber fabric 4b of the third layer, and another E-glass prepreg equivalent to the glass fiber fabric 5b of the fourth layer are sequentially superimposed on the glass fiber fabric 2 of the center layer.

During this procedure, the prepreg with the same glass composition and the same thickness is laminated for each layer. For example, glass prepregs of the second layer equivalent to 3a and 3b shown in FIG. 1 should be T-glass prepregs with the same thickness.

Other mirror plates are superimposed on the thus formed glass fiber fabric laminate, then pressed using a vacuum press machine under the conditions of a temperature of 130 to 180° C., a surface pressure of 10 to 30 kg/cm$^2$, and a pressure application time of 10 to 150 minutes, and subsequently cooled. When pressed as described above, the resin composition is fused and impregnated into each of the T-glass fiber fabric or the E-glass fiber fabric and the glass fiber fabric laminate is consequently integrated. The glass fiber fabric-resin composition laminate 1 shown in FIG. 1 can be thus obtained.

The present embodiment describes the case where the glass fiber fabrics 2 to 4 of the center layer and the second layer and the third layer are composed of the T-glass fiber fabric and the glass fiber fabric 5 of the fourth layer is composed of the E-glass fiber fabric, but is not limited thereto. In the glass fiber fabric-resin composition laminate 1, a total thickness of the layers composed of the T-glass fiber fabric may be 50% or more with respect to the total thickness of the glass fiber fabrics of all layers or all layers may be composed of the T-glass fiber fabric.

Figure 2A:
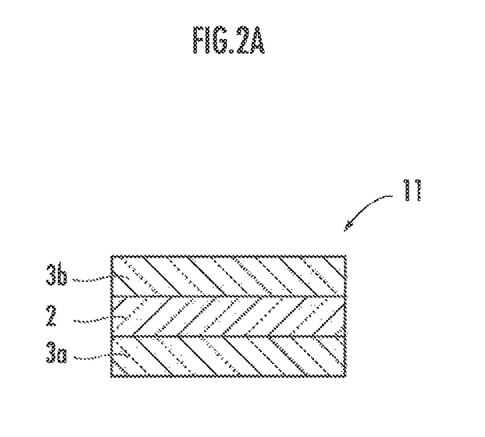
FIG. 2A shows the glass fiber fabric-resin composition laminate of the first variant.
Figure 2B:
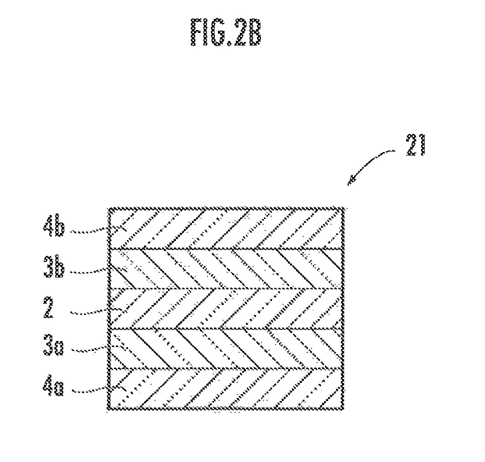
FIG. 2B shows the glass fiber fabric-resin composition laminate of the second variant.

For the production of the laminate using a resin film or for the production of the laminate by preparing prepregs using a thermosetting resin, the number of laminates is not limited as long as the glass fiber fabric-resin composition laminate 1 has other glass fiber fabrics laminated on both front and back sides of the glass fiber fabric 2 of the center layer. For example, as shown in FIG. 2A, the glass fiber fabric 2 of the center layer may have glass fiber fabrics 3a and 3b of the second layer laminated on both front and back sides thereof to form a 3-layer structure glass fiber fabric-resin composition laminate 11. Alternatively, as shown in FIG. 2B, glass fiber fabrics 3a and 3b of the second layer of FIG. 2A may further have the third layer glass fiber fabrics 4a and 4b laminated thereon to form a 5-layer structure glass fiber fabric-resin composition laminate 21.

In place of the resin film and the thermosetting resin, a resin powder, a resin fiber nonwoven fabric, prepolymerized monomers, an emulsified resin, or a resin dissolved in a solvent may also be used. When a resin film, a nonwoven fabric, or a powder is used, plasma treatment may also be conducted to improve adhesive properties.

In the glass fiber fabric-resin composition laminate 1, the total thickness of the glass fiber fabrics of all layers is preferably 150 to 450 µm and particularly preferably 200 to 400 µm. In the glass fiber fabric-resin composition laminate 1, the thickness of the glass fiber fabric 2 of the center layer is preferably 30 to 150 µm, the thickness of the outermost layer glass fiber fabric is preferably 30 to 100 µm, and the thickness of glass fiber fabrics 3a, 3b, 4a, and 4b of layers other than the above layers is preferably 30 to 100 µm. The thickness of the glass fiber fabric 2 of the center layer is more preferably 80 to 150 µm for assuring the laminate with a high strength. The thickness of the outermost layer glass fiber fabric is more preferably 30 to 70 µm for assuring a particularly smooth surface.

In the glass fiber fabric-resin composition laminate 1, when the T-glass fiber fabric has a total thickness of 60 to 100%, preferably 70 to 100%, and more preferably 85 to 100%, with respect to the total thickness of a plurality of glass fiber fabrics, a strength, rigidity, and dimension stability can be more improved.

In the glass fiber fabric-resin composition laminate 1, when the outermost layer glass fiber fabric is the E-glass fiber fabric and the T-glass fiber fabric has a total thickness of 60 to 93%, more preferably 70 to 90%, particularly preferably 70 to 85%, with respect to the total thickness of a plurality of glass fiber fabrics, a clear surface can be assured compatibly with strength, rigidity, and dimension stability.

The outermost layer glass fiber fabric used herein typically means 5a and 5b but when the glass fiber fabric-resin composition laminate 1 is used for a housing, or the like, and either one of 5a and 5b is usually observed with naked eyes, the outermost layer glass fiber fabric may mean either 5a or 5b, the side usually observed with naked eyes.

Examples and Comparative Examples of the present invention are illustrated below.

EXAMPLE

1. Case where Polyamide 6 is Used as the Resin Composition 1-1. Evaluation on a Three-Layer Structure Glass Fiber Fabric-Resin Composition Laminate 11

Example 1

In the present Example, a three-layer structure glass fiber fabric-resin composition laminate 11 shown in FIG. 2A was produced.

A 100 μm-T-glass fiber fabric (manufactured by Nitto Boseki Co., Ltd., IPC Specification 2116) was prepared as the first glass fiber fabric.

The 100 μm-T-glass fiber fabric is treated with a silane coupling agent, open-fiber processed using injected water, and cut to a dimension of 300 mm×300 mm. The silane coupling agent treatment is carried out using N-(vinylbenzyl)-2-aminoethyl-3-aminopropyltrimethoxysilane as the silane coupling agent, and 0.1 parts by mass of the silane coupling agent is adhered to 100 parts by mass of the T-glass fiber fabric.

A resin film precut to a dimension of 300 mm×300 mm, composed of polyamide 6 (tradename: DIAMIRON C-Z, Mitsubishi Plastics, Inc., thickness 25 μm) as the resin composition and a 100 μm-T-glass fiber fabric were superimposed on a stainless steel mirror plate to form a glass fiber fabric laminate.

For the formation of the above glass fiber fabric laminate, the resin film was superimposed on the mirror plate and the 100 μm-T-glass fiber fabric, i.e., the second glass fiber fabric 3a, was further superimposed thereon. The resin film was then superimposed on the second glass fiber fabric 3a and another 100 μm-T-glass fiber fabric, i.e., the glass fiber fabric 2 of the center layer, was further superimposed thereon.

The above resin film was superimposed on the glass fiber fabric 2 of the center layer, another 100 μm-T-glass fiber fabric, i.e., the second glass fiber fabric 3b, was further superimposed thereon, and the resin film was superimposed thereon to form the glass fiber fabric laminate described above. The resin film used in the obtained glass fiber fabric laminate was 50 mass % to the overall glass fiber fabric laminate.

Other mirror plates were superimposed on the obtained glass fiber fabric laminate and pressed using a press machine (Model No.: TD-50, Toho Machinery Co., Ltd.) under the conditions of a temperature of 240° C., a surface pressure of 5 kg/cm$^2$, and a pressure application time of 30 seconds, and subsequently cooled to obtain the glass fiber fabric-resin composition laminate 11 shown in FIG. 2A.

The obtained glass fiber fabric-resin composition laminate 11 had an overall thickness of 300 μm and the glass fiber fabrics 2 and 3 of all layers are composed of the T-glass fiber fabric.

The obtained glass fiber fabric-resin composition laminate 11 was cut using a diamond cutter to a dimension of 25 mm×300 mm to produce test pieces.

Figure 3:
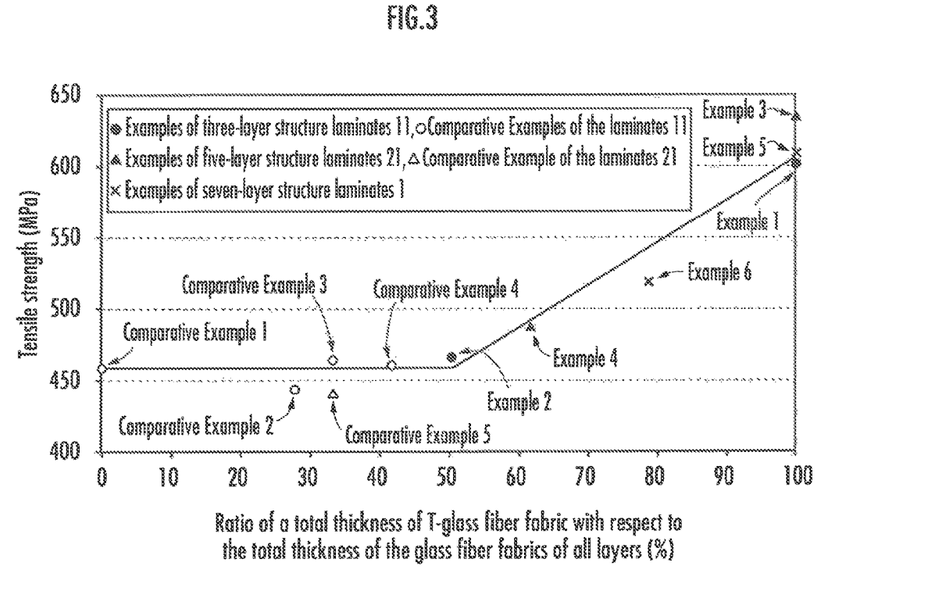
FIG. 3 is a graph showing a relationship between the T-glass content ratio and the strength of the glass fiber fabric-resin composition laminates of Examples 1 to 6 and Comparative Examples 1 to 5.

The test piece was measured for a tensile strength using an autograph precision universal tester (model No.: AG5000B, Shimadzu Corporation) at a test distance of 200 mm and a tension rate of 5 mm/min. The tensile strength was 601 MPa. FIG. 3 shows the results. The above test piece was measured for an elastic modulus using the above autograph precision universal tester. The elastic modulus was 23 GPa.

The glass fiber fabric-resin composition laminate 11 of the present Example was measured for a Lab color space with a white board placed at the back of the sample to be the indicator for evaluating the transparency and color tone. The Lab color space was (L, a, b)=(75.03, −3.51, 1.35). The measurement of the Lab color space was carried out using a spectrophotometer (model No.: Spectrophotometer-SE6000, Nippon Denshoku Industries Co., Ltd.).

The glass fiber fabric-resin composition laminate 11 of the present Example was measured, using a surface roughness tester (model No.: J-47-2-0130, Mitsutoyo Corporation), for a center average roughness Ra to evaluate the surface roughness. The center average roughness was 0.11 μm.

The obtained results are shown in Table 1.

Comparative Example 1

A 100 μm-E-glass fiber fabric (manufactured by Nitto Boseki Co., Ltd., IPC Specification 2116) was prepared as the second glass fiber fabric.

The 100 μm-E-glass fiber fabric is treated with a silane coupling agent, open-fiber processed using injected water, and cut to a dimension of 300 mm×300 mm exactly in the same method as in the T-glass fiber fabric used in Example 1.

The glass fiber fabric-resin composition laminate 11 was obtained exactly in the same manner as in Example 1, with the exception that the 100 μm-E-glass fiber fabric was used in place of the 100 μm-T-glass fiber fabric.

The obtained glass fiber fabric-resin composition laminate 11 had an overall thickness of 300 μm and the glass fiber fabrics 2 and 3 of all layers are composed of the E-glass fiber fabric.

Using the obtained glass fiber fabric-resin composition laminate 11, a test piece was produced exactly in the same manner as in Example 1 and measured for a tensile strength and an elastic modulus. The tensile strength was 458 MPa and the elastic modulus was 17 GPa. The result of tensile strength is shown in FIG. 3.

The glass fiber fabric-resin composition laminate 11 of the present Comparative Example was measured for a Lab color space exactly in the same manner as in Example 1. The Lab color space was (L, a, b)=(63.60, −4.28, −1.24).

The glass fiber fabric-resin composition laminate 11 of the present Comparative Example was measured for a surface roughness exactly in the same manner as in Example 1. The surface roughness was 0.12 μm. The obtained results are shown in Table 1.

Comparative Example 2

In the glass fiber fabric-resin composition laminate 11 of Example 1, the E-glass fiber fabric was used as glass fiber fabrics 3a and 3b of the second layer whose thickness was changed and the obtained laminate was evaluated.

In the present Comparative Example, the glass fiber fabric-resin composition laminate 11 was obtained exactly in the same manner as in Example 1, with the exception that one sheet of 100 μm-E-glass fiber fabric and one sheet of 30 μm-E-glass fiber fabric (manufactured by Nitto Boseki Co., Ltd., IPC Specification 1067) were laminated without the resin composition therethrough as the glass fiber fabrics 3a and 3b of the second layer.

The obtained glass fiber fabric-resin composition laminate 11 had an overall thickness of 360 μm and a total thickness of the T-glass fiber fabric is 28% to the overall thickness.

Using the obtained glass fiber fabric-resin composition laminate 11, a test piece was produced exactly in the same manner as in Example 1 and measured for a tensile strength and an elastic modulus. The tensile strength was 444 MPa and the elastic modulus was 19 GPa. The result of tensile strength is shown in FIG. 3.

The glass fiber fabric-resin composition laminate 11 of the present Comparative Example was measured for a Lab color space exactly in the same manner as in Example 1. The Lab color space was (L, a, b)=(64.48, −4.06, −0.90).

The glass fiber fabric-resin composition laminate 11 of the present Comparative Example was measured for a surface roughness exactly in the same manner as in Example 1. The surface roughness was 0.50 μm. The obtained results are shown in Table 1.

Comparative Example 3

In the present Comparative Example, the glass fiber fabric-resin composition laminate 11 was obtained exactly in the same manner as in Example 1, with the exception that the 100 μm-E-glass fiber fabric was used as glass fiber fabrics 3a and 3b of the second layer.

The obtained glass fiber fabric-resin composition laminate 11 had an overall thickness of 300 μm and a total thickness of the T-glass fiber fabric is 33% to the overall thickness.

Using the obtained glass fiber fabric-resin composition laminate 11, a test piece was produced exactly in the same manner as in Example 1 and measured for a tensile strength and an elastic modulus. The tensile strength was 465 MPa and the elastic modulus was 19 GPa. The result of tensile strength is shown in FIG. 3.

The glass fiber fabric-resin composition laminate 11 of the present Comparative Example was measured for a Lab color space exactly in the same manner as in Example 1. The Lab color space was (L, a, b)=(65.65, −3.98, −0.45).

The glass fiber fabric-resin composition laminate 11 of the present Comparative Example was measured for a surface roughness exactly in the same manner as in Example 1. The surface roughness was 0.12 μm. The obtained results are shown in Table 1.

Comparative Example 4

In the present Comparative Example, the glass fiber fabric-resin composition laminate 11 was obtained exactly in the same manner as in Example 1, with the exception that one sheet of 70 μm-E-glass fiber fabric (manufactured by Nitto Boseki Co., Ltd., IPC Specification 3313) was used as glass fiber fabrics 3a and 3b of the second layer.

The obtained glass fiber fabric-resin composition laminate 11 had an overall thickness of 240 μm and a total thickness of the T-glass fiber fabric is 42% to the overall thickness.

Using the obtained glass fiber fabric-resin composition laminate 11, a test piece was produced exactly in the same manner as in Example 1 and measured for a tensile strength and an elastic modulus. The tensile strength was 461 MPa and the elastic modulus was 20 GPa. The result of tensile strength is shown in FIG. 3.

The glass fiber fabric-resin composition laminate 11 of the present Comparative Example was measured for a Lab color space exactly in the same manner as in Example 1. The Lab color space was (L, a, b)=(65.91, −3.94, −0.35).

The glass fiber fabric-resin composition laminate 11 of the present Comparative Example was measured for a surface roughness exactly in the same manner as in Example 1. The surface roughness was 0.08 μm. The obtained results are shown in Table 1.

Example 2

In the present Example, the glass fiber fabric-resin composition laminate 11 was obtained exactly in the same manner as in Example 1, with the exception that one sheet of 50 μm-E-glass fiber fabric was used as glass fiber fabrics 3a and 3b of the second layer.

The obtained glass fiber fabric-resin composition laminate 11 had an overall thickness of 200 μm and a total thickness of the T-glass fiber fabric is 50% to the overall thickness.

Using the obtained glass fiber fabric-resin composition laminate 11, a test piece was produced exactly in the same manner as in Example 1 and measured for a tensile strength and an elastic modulus. The tensile strength was 467 MPa and the elastic modulus was 20 GPa. The result of tensile strength is shown in FIG. 3.

The glass fiber fabric-resin composition laminate 11 of the present Example was measured for a Lab color space exactly in the same manner as in Example 1. The Lab color space was (L, a, b)=(66.78, −3.88, −0.05).

The glass fiber fabric-resin composition laminate 11 of the present Example was measured for a surface roughness exactly in the same manner as in Example 1. The surface roughness was 0.08 μm. The obtained results are shown in Table 1.

1-2. Evaluation on a Five-Layer Structure Glass Fiber Fabric-Resin Composition Laminate 21

Example 3

In the present Example, the five-layer structure glass fiber fabric-resin composition laminate 21 shown in FIG. 2B was produced.

The glass fiber fabric-resin composition laminate 21 was obtained exactly in the same manner as in Example 2, with the exception that a T-glass fiber fabric was used as glass fiber fabrics 3a and 3b of the second layer and one sheet of 50 μm-T-glass fiber fabric was superimposed on the front layer side thereof to form the third layer glass fiber fabrics 4a and 4b.

The obtained glass fiber fabric-resin composition laminate 21 had an overall thickness of 300 μm and a total thickness of the T-glass fiber fabric is 100% to the overall thickness.

Using the obtained glass fiber fabric-resin composition laminate 21, a test piece was produced exactly in the same manner as in Example 2 and measured for a tensile strength and an elastic modulus. The tensile strength was 632 MPa and the elastic modulus was 23 GPa. The result of tensile strength is shown in FIG. 3.

The glass fiber fabric-resin composition laminate 21 of the present Example was measured for a Lab color space exactly in the same manner as in Example 2. The Lab color space was (L, a, b)=(74.10, −3.48, 1.38).

The glass fiber fabric-resin composition laminate 21 of the present Example was measured for a surface roughness exactly in the same manner as in Example 2. The surface roughness was 0.08 μm. The obtained results are shown in Table 1.

Comparative Example 5

In the present Comparative Example, the glass fiber fabric-resin composition laminate 21 was obtained exactly in the same manner as in Example 3, with the exception that one sheet of 50 μm-E-glass fiber fabric was used as glass fiber fabrics 3a and 3b of the second layer and one sheet of 50 μm-E-glass fiber fabric was used as the third layer glass fiber fabrics 4a and 4b.

The obtained glass fiber fabric-resin composition laminate 21 had an overall thickness of 300 μm and a total thickness of the T-glass fiber fabric is 33% to the overall thickness.

Using the obtained glass fiber fabric-resin composition laminate 21, a test piece was produced exactly in the same manner as in Example 3 and measured for a tensile strength and an elastic modulus. The tensile strength was 441 MPa and the elastic modulus was 19 GPa. The result of tensile strength is shown in FIG. 3.

The glass fiber fabric-resin composition laminate 21 of the present Comparative Example was measured for a Lab color space exactly in the same manner as in Example 3. The Lab color space was (L, a, b)=(65.05, −4.01, −0.49).

The glass fiber fabric-resin composition laminate 21 of the present Comparative Example was measured for a surface roughness exactly in the same manner as in Example 3. The surface roughness was 0.08 μm. The obtained results are shown in Table 1.

Example 4

In the present Example, the glass fiber fabric-resin composition laminate 21 was obtained exactly in the same manner as in Example 3, with the exception that one sheet of 30 μm-T-glass fiber fabric was used as glass fiber fabrics 3a and 3b of the second layer and one sheet of 50 μm-E-glass fiber fabric was used as the third layer glass fiber fabrics 4a and 4b.

The obtained glass fiber fabric-resin composition laminate 21 had an overall thickness of 260 μm and a total thickness of the T-glass fiber fabric is 62% to the overall thickness.

Using the obtained glass fiber fabric-resin composition laminate 21, a test piece was produced exactly in the same manner as in Example 3 and measured for a tensile strength and an elastic modulus. The tensile strength was 488 MPa and the elastic modulus was 21 GPa. The result of tensile strength is shown in FIG. 3.

The glass fiber fabric-resin composition laminate 21 of the present Example was measured for the Lab color space exactly in the same manner as in Example 3. The Lab color space was (L, a, b)=(67.90, −3.78, 0.07).

The glass fiber fabric-resin composition laminate 21 of the present Example was measured for a surface roughness exactly in the same manner as in Example 3. The surface roughness was 0.08 μm. The obtained results are shown in Table 1.

1-3. Evaluation on a Seven-Layer Structure Glass Fiber Fabric-Resin Composition Laminate 1

Example 5

In the present Example, the seven-layer structure glass fiber fabric-resin composition laminate 1 shown in FIG. 1 was produced.

The glass fiber fabric-resin composition laminate 1 was obtained exactly in the same manner as in Example 4, with the exception that the third layer glass fiber fabrics 4a and 4b were prepared using one sheet of 30 μm-T-glass fiber fabric and another sheet of 30 μm-T-glass fiber fabric (manufactured by Nitto Boseki Co., Ltd., IPC Specification 1067) was superimposed on the front layer side of the third layer glass fiber fabrics 4a and 4b to form the fourth layer glass fiber fabrics 5a and 5b.

The obtained glass fiber fabric-resin composition laminate 1 had an overall thickness of 280 μm and the glass fiber fabrics 2 to 5 of all layers are composed of the T-glass fiber fabric.

Using the obtained glass fiber fabric-resin composition laminate 1, a test piece was produced exactly in the same manner as in Example 4 and measured for a tensile strength and an elastic modulus. The tensile strength was 608 MPa and the elastic modulus was 22 GPa. The result of tensile strength is shown in FIG. 3.

The glass fiber fabric-resin composition laminate 1 of the present Example was measured for the Lab color space exactly in the same manner as in Example 4. The Lab color space was (L, a, b)=(73.95, −3.47, 1.37).

The glass fiber fabric-resin composition laminate 1 of the present Example was measured for a surface roughness exactly in the same manner as in Example 4. The surface roughness was 0.07 μm. The obtained results are shown in Table 1.

Example 6

In the present Example, the glass fiber fabric-resin composition laminate 1 was obtained exactly in the same manner as in Example 5, with the exception that a 30 μm-E-glass fiber fabric was used as the fourth layer glass fiber fabrics 5a and 5b.

The obtained glass fiber fabric-resin composition laminate 1 had an overall thickness of 280 μm and a total thickness of the T-glass fiber fabric is 79% to the overall thickness.

Using the obtained glass fiber fabric-resin composition laminate 1, a test piece was produced exactly in the same manner as in Example 5 and measured for a tensile strength and an elastic modulus. The tensile strength was 519 MPa and the elastic modulus was 22 GPa. The result of tensile strength is shown in FIG. 3.

The glass fiber fabric-resin composition laminate 1 of the present Example was measured for a Lab color space exactly in the same manner as in Example 5. The Lab color space was (L, a, b)=(69.72, −3.64, 0.37).

The glass fiber fabric-resin composition laminate 1 of the present Example was measured for a surface roughness exactly in the same manner as in Example 5. The surface roughness was 0.08 μm. The obtained results are shown in Table 1.

TABLE 1

| | | Example 1 | Comparative Example 1 | Comparative Example 2 | Comparative Example 3 | Comparative Example 4 | Example 2 |
|---|---|---|---|---|---|---|---|
| Center layer | Glass/thickness (μm) | T/100 | E/100 | T/100 | T/100 | T/100 | T/100 |
| Second layer | Glass/thickness (μm) | T/100 | E/100 | E/130 | E/100 | E/70 | E/50 |
| Third layer | Glass/thickness (μm) | — | — | — | — | — | — |
| Fourth layer | Glass/thickness (μm) | — | — | — | — | — | — |
| Overall thickness of laminate (μm) | | 300 | 300 | 360 | 300 | 240 | 200 |
| Total thickness of T-glass (%) | | 100 | 0 | 28 | 33 | 42 | 50 |

TABLE 1-continued

| | | | | | | |
|---|---|---|---|---|---|---|
| Tensile strength (MPa) | 601 | 458 | 444 | 465 | 461 | 467 |
| Tensile elastic modulus (GPa) | 23 | 17 | 19 | 19 | 20 | 20 |
| Hue  L | 75.03 | 63.60 | 64.48 | 65.65 | 65.91 | 66.78 |
|      a | −3.51 | 4.28 | 4.06 | −3.98 | −3.94 | −3.88 |
|      b | 1.35 | −1.24 | −0.90 | −0.45 | −0.35 | −0.05 |
| Average roughness (µm) | 0.11 | 0.12 | 0.50 | 0.12 | 0.08 | 0.08 |

| | Example 3 | Comparative Example 5 | Example 4 | Example 5 | Example 6 |
|---|---|---|---|---|---|
| Center layer Glass/thickness (µm) | T/100 | T/100 | T/100 | T/100 | T/100 |
| Second layer Glass/thickness (µm) | T/50 | E/50 | T/30 | T/30 | T/30 |
| Third layer Glass/thickness (µm) | T/50 | E/50 | E/50 | T/30 | T/30 |
| Fourth layer Glass/thickness (µm) | — | — | — | T/30 | E/30 |
| Overall thickness of laminate (µm) | 300 | 300 | 260 | 280 | 280 |
| Total thickness of T-glass (%) | 100 | 33 | 62 | 100 | 79 |
| Tensile strength (MPa) | 632 | 441 | 488 | 608 | 519 |
| Tensile elastic modulus (GPa) | 23 | 19 | 21 | 22 | 22 |
| Hue  L | 74.10 | 65.05 | 67.90 | 73.95 | 69.72 |
|      a | −3.48 | 4.01 | −3.78 | −3.47 | −3.64 |
|      b | 1.38 | −0.49 | 0.07 | 1.37 | 0.37 |
| Average roughness (µm) | 0.08 | 0.08 | 0.08 | 0.07 | 0.08 |

FIG. 3 and Table 1 evidently demonstrate that the glass fiber fabric-resin composition laminates 11, 21 and 1, when having an overall thickness in a range from 200 to 300 µm and a total thickness ratio of the T-glass fiber fabric being 50% or more to the overall thickness (Examples 1 to 6), have higher strengths than that of the laminate having an overall thickness of 300 µm and all layers composed only of the E-glass fiber fabric (Comparative Example 1).

The glass fiber fabric-resin composition laminates of Examples 1 to 6 had a tensile strength of 465 MPa or more and an elastic modulus of 20 GPa or more, hence being suitable for housings of mobile phones, laptops, liquid crystal televisions, and the like. These laminates can assure better durability even when made thinner and larger than the currently available products.

The tensile strength of currently available housings for mobile phones, and the like, when calculated by a 0.4 mm thickness, is about 390 to 420 MPa and the tensile elastic modulus is about 20 GPa. Housings are required to have a high tensile elastic modulus. All Examples of the present invention show significantly higher tensile strengths than those of the currently available products and also have substantially equal elastic moduli thereto.

Further, the glass fiber fabric-resin composition laminates of Examples 1 and 3 to 6 with a strength of 480 MPa or more and an elastic modulus of 21 GPa or more have particularly higher strength, hence being particularly suitable for housings described above. These laminates can assure particularly better durability even when made thinner and larger than the currently available products.

The glass fiber fabric-resin composition laminates 11, 21, and 1 of Examples 1 to 6 have a surface roughness of 0.07 to 0.11 µm, which confirms the tendency that the thinner the outermost layer glass fiber fabric is, the smaller the surface roughness is.

The glass fiber fabric-resin composition laminates 11, 21, and 1 of respective Examples 1 to 6 were visually evaluated for the transparency and color tone. The glass fiber fabric-resin composition laminates 11, 21, and 1 of Examples 1, 3, and 5, whose outermost layer is composed of the T-glass fiber fabric, were opaque. All of the glass fiber fabric-resin composition laminates 11, 21, and 1 of Examples 2, 4, and 6, whose outermost layer is composed of the E-glass fiber fabric, had an L value of the Lab color space being below 70, which was lower than that of Examples 1, 3, and 5 whose outermost layer is composed of the T-glass fiber fabric and allowed light irradiated to the surface to pass through and had a clear surface. In view of this, the glass fiber fabric-resin composition laminates 11, 21, and 1 were revealed to have different looks depending on the kind of the outermost layer glass fiber fabric.

2. Case where an Epoxy Resin is Used as the Resin Composition

It was confirmed that a laminate with a high strength and a high elastic modulus was similarly obtained even when a different resin was used. Using an epoxy resin, a prepreg was first produced, consequently a laminate was produced and evaluated for a strength and an elastic modulus.

Example 7

In the present Example, a 100 µm-T-glass fiber fabric (manufactured by Nitto Boseki Co., Ltd., IPC Specification 2116) was prepared to be the first glass fiber fabric.

The 100 µm-T-glass fiber fabric is treated with a silane coupling agent, open-fiber processed using injected water, and cut to a dimension of 300 mm×300 mm. The silane coupling agent treatment is carried out using N-(vinylbenzyl)-2-aminoethyl-3-aminopropyltrimethoxysilane as the silane coupling agent, and 0.1 parts by mass of the silane coupling agent is adhered to 100 parts by mass of the T-glass fiber fabric.

A resin composition such as an epoxy resin is impregnated into the T-glass fiber fabric using a brush and superimposed to achieve a desired thickness while defoaming to produce the T-glass fiber fabric laminate or the E-glass fiber fabric laminate. The epoxy resin contains a curing agent.

The obtained T-glass fiber fabric laminate is dried using a hot air dryer at 130° C. for 8 minutes to produce a 100 µm-T-glass prepreg.

The T-glass prepreg equivalent to the glass fiber fabric 3 of the second layer and another T-glass prepreg equivalent to the glass fiber fabric 2 of the center layer are sequentially superimposed on the mirror plate.

Another T-glass prepreg equivalent to the glass fiber fabric 3b of the second layer is superimposed on the glass fiber fabric 2 of the center layer. The T-glass prepreg equivalent to the glass fiber fabric 3b of the second layer has the same thickness as that of the T-glass prepreg of the glass fiber fabric 3*a* of the second layer.

Other mirror plates are superimposed on the thus formed glass fiber fabric laminate, then pressed using a vacuum press machine under the conditions of a temperature of 180° C., a surface pressure of 20 kg/cm$^2$, and a pressure application time of 150 minutes, and subsequently cooled. When pressed as described above, the resin composition is fused and impregnated into each of the T-glass fiber fabrics or the E-glass fiber fabric and the glass fiber fabric laminate is consequently integrated. The glass fiber fabric-resin composition laminate 11 shown in FIG. 3 can be thus obtained.

The obtained glass fiber fabric-resin composition laminate 11 had an overall thickness of 300 μm, the glass fiber fabrics 2 and 3 of all layers are composed of the T-glass fiber fabric, and have the substantially same structure as that of the glass fiber fabric-resin composition laminate 11 of Example 1.

Using the obtained glass fiber fabric-resin composition laminate 11, a test piece was produced exactly in the same manner as in Example 1 and measured for a tensile strength and an elastic modulus. The tensile strength was 541 MPa and the elastic modulus was 23.4 GPa.

The glass fiber fabric-resin composition laminate 11 of the present Example was measured for a Lab color space exactly in the same manner as in Example 1, with the exception that a white board was not placed at the back of the sample. The Lab color space was (L, a, b)=(43.68, −2.64, 3.08). When an epoxy resin is used, a laminate becomes transparent and hence a white board does not need to be placed at the back of the sample.

The obtained glass fiber fabric-resin composition laminate 11 of the present Example was measured for a surface roughness exactly in the same manner as in Example 1. The surface roughness was 0.20 μm.

The obtained results are shown in Table 2.

Comparative Example 6

In the present Comparative Example, the glass fiber fabric-resin composition laminate 11 was produced exactly in the same manner as in Comparative Example 1, with the exception that a glass fiber-epoxy resin prepreg composed of the above epoxy resin was used as the resin composition.

The obtained glass fiber fabric-resin composition laminate 11 had an overall thickness of 300 μm and the glass fiber fabrics 2 and 3 of all layers are composed of the E-glass fiber fabric.

Using the obtained glass fiber fabric-resin composition laminate 11, a test piece was produced exactly in the same manner as in Example 7 and measured for a tensile strength and an elastic modulus. The tensile strength was 393 MPa and the elastic modulus was 18.2 GPa.

The glass fiber fabric-resin composition laminate 11 of the present Comparative Example was measured for a Lab color space exactly in the same manner as in Example 7. The Lab color space was (L, a, b)=(31.40, −1.11, −1.95).

The glass fiber fabric-resin composition laminate 11 of the present Comparative Example was measured for a surface roughness exactly in the same manner as in Example 7. The surface roughness was 0.07 μm. The obtained results are shown in Table 2.

Example 8

In the present Example, the five-layer structure glass fiber fabric-resin composition laminate 21 shown in FIG. 2B was produced exactly in the same manner as in Example 3, with the exception that a glass fiber-epoxy resin prepreg composed of the above epoxy resin was used as the resin composition.

The obtained glass fiber fabric-resin composition laminate 21 had an overall thickness of 300 μm and a total thickness of the T-glass fiber fabric is 100% to the overall thickness.

Using the obtained glass fiber fabric-resin composition laminate 21, a test piece was produced exactly in the same manner as in Example 7 and measured for a tensile strength and an elastic modulus. The tensile strength was 549 MPa and the elastic modulus was 23.0 GPa.

The glass fiber fabric-resin composition laminate 21 of the present Example was measured for a Lab color space exactly in the same manner as in Example 7. The Lab color space was (L, a, b)=(45.12, −2.45, 0.76).

The glass fiber fabric-resin composition laminate 21 of the present Example was measured for a surface roughness exactly in the same manner as in Example 7. The surface roughness was 0.13 μm. The obtained results are shown in Table 2.

Comparative Example 7

In the present Comparative Example, the glass fiber fabric-resin composition laminate 21 was produced exactly in the same manner as in Comparative Example 5, with the exception that a glass fiber-epoxy resin prepreg composed of the above epoxy resin was used as the resin composition.

The obtained glass fiber fabric-resin composition laminate 21 had an overall thickness of 300 μm and a total thickness of the T-glass fiber fabric is 33% to the overall thickness.

Using the obtained glass fiber fabric-resin composition laminate 21, a test piece was produced exactly in the same manner as in Example 7 and measured for a tensile strength and an elastic modulus. The tensile strength was 385 MPa and the elastic modulus was 18.5 GPa.

The glass fiber fabric-resin composition laminate 21 of the present Example was measured for a Lab color space exactly in the same manner as in Example 7. The Lab color space was (L, a, b)=(36.24, −1.76, −0.91).

The glass fiber fabric-resin composition laminate 21 of the present Example was measured for a surface roughness exactly in the same manner as in Example 7. The surface roughness was 0.09 μm. The obtained results are shown in Table 2.

TABLE 2

|  |  | Example 7 | Comparative Example 6 | Example 8 | Comparative Example 7 |
|---|---|---|---|---|---|
| Center layer | Glass/thickness (μm) | T/100 | E/100 | T/100 | T/100 |
| Second layer | Glass/thickness (μm) | T/100 | E/100 | T/50 | E/50 |
| Third layer | Glass/thickness (μm) | — | — | T/50 | E/50 |
| Fourth layer | Glass/thickness (μm) | — | — | — | — |

TABLE 2-continued

|  | Example 7 | Comparative Example 6 | Example 8 | Comparative Example 7 |
|---|---|---|---|---|
| Overall thickness of laminate (μm) | 300 | 300 | 300 | 300 |
| Total thickness of T-glass (%) | 100 | 0 | 100 | 33 |
| Tensile strength (MPa) | 541 | 393 | 549 | 385 |
| Tensile elastic modulus (GPa) | 23.4 | 18.2 | 23 | 18.5 |
| Hue  L | 43.68 | 31.40 | 45.12 | 36.24 |
| a | −2.64 | −1.11 | −2.45 | −1.76 |
| b | 3.08 | −1.95 | 0.76 | −0.91 |
| Average roughness (μm) | 0.20 | 0.07 | 0.13 | 0.09 |

As evident from the comparisons between Example 7 and Comparative Example 6 and Example 8 and Comparative Example 7 appeared in Table 2, even when the epoxy resin is used, the strength of laminates is determined depending on the ratio with respect to the total thickness of the T-glass fiber fabric as in the case where a film composed of polyamide 6 is used.

In the glass fiber fabric-resin composition laminates 11, 21, and 1, it is evident that the tensile strength and elastic modulus are determined depending on the ratio of the total thickness of the T-glass fiber fabric. Even when a thermoplastic resin other than polyamide 6 or a thermosetting resin other than an epoxy resin is used, in other words, regardless of the kind of resin used, a laminate with desired tensile strength and elastic modulus can be produced by regulating a total thickness of the first glass fiber fabric, i.e., the T-glass fiber fabric, with respect to the total thickness of the glass fiber fabrics.

REFERENCE SIGNS LIST 1, 11, 21 . . . glass fiber fabric-resin composition laminate, 2 . . . glass fiber fabric of the center layer, 3a, 3b . . . glass fiber fabrics of the second layer, 4a, 4b . . . glass fiber fabrics of the third layer, 5a, 5b . . . glass fiber fabrics of the fourth layer

The invention claimed is:

1. A glass fiber fabric-resin composition laminate comprising a plurality of glass fiber fabrics laminated via a resin composition, wherein
the plurality of glass fiber fabrics comprises one or more layers of a first glass fiber fabric and one or more layers of a second glass fiber fabric,
the one or more layers of the first glass fiber fabric has a total thickness in a range from 60 to 93% with respect to a total thickness of the plurality of glass fiber fabrics, and
a glass composition of the first glass fiber fabric has, based on a total mass, an $SiO_2$ content of 57 to 70 mass %, an $Al_2O_3$ content of 18 to 30 mass %, an MgO content of 5 to 15 mass %, a CaO content of 0 to 12 mass %, a content of at least one of $Li_2O$, $Na_2O$, and $K_2O$ of 0.01 to 1 mass %, a $TiO_2$ content of 0 to 1 mass %, and a $B_2O_3$ content of 0 to 1 mass %,
wherein a glass composition of the second glass fiber fabric has, based on the total mass, an $SiO_2$ content of 52 to 56 mass %, an $Al_2O_3$ content of 12 to 16 mass %, a total content of CaO and MgO of 20 to 25 mass %, and a $B_2O_3$ content of 5 to 10 mass %; and
the laminate has a tensile strength of greater than 465 Mpa and an elastic modulus of 20 GPa or greater.

2. The glass fiber fabric-resin composition laminate according to claim 1,
wherein the glass fiber fabric of each layer has a thickness in a range from 30 to 150 μm.

3. The glass fiber fabric-resin composition laminate according to claim 1,
wherein an outermost layer glass fiber fabric has a thickness in a range from 30 to 100 μm.

4. The glass fiber fabric-resin composition laminate according to claim 1,
wherein other glass fiber fabrics with the same composition and the same thickness are respectively provided on both front and back sides of a glass fiber fabric of a center layer so as to be plane-symmetrical with respect to a plane equally dividing the glass fiber fabric of the center layer in a thickness direction as a symmetric plane.

5. The glass fiber fabric-resin composition laminate according to claim 1, having a tensile strength of 488 MPa or more, and an elastic modulus of 21 GPa or more.

6. The glass fiber fabric-resin composition laminate according to claim 1, wherein a total thickness of the glass fiber fabrics is from 150 to 450 μm.

7. The glass fiber fabric-resin composition laminate according to claim 1, wherein an outermost layer glass fiber fabric has a thickness from 30 to 70 μm.

8. The glass fiber fabric-resin composition laminate according to claim 1, wherein the one or more layers of the first glass fiber fabric has a total thickness of from 70 to 93% with respect to the total thickness of the plurality of glass fiber fabrics.

9. The glass fiber fabric-resin composition laminate composition of claim 1 wherein the laminate has a tensile strength of between 488 Mpa and 632 Mpa, and an elastic modulus of from 21 to 23 GPa at an overall thickness of from 260 to 300 μm.

* * * * *